US012131598B2

(12) United States Patent
Li et al.

(10) Patent No.: US 12,131,598 B2
(45) Date of Patent: Oct. 29, 2024

(54) TESTING METHOD AND APPARATUS FOR VEHICLE PERCEPTION SYSTEM, DEVICE, AND STORAGE MEDIUM

(71) Applicant: Apollo Intelligent Connectivity (Beijing) Technology Co., Ltd., Beijing (CN)

(72) Inventors: Dan Li, Beijing (CN); Mengqin Ai, Beijing (CN); Qian Chen, Beijing (CN); Jianping Li, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 451 days.

(21) Appl. No.: 17/464,771

(22) Filed: Sep. 2, 2021

(65) Prior Publication Data

US 2021/0398366 A1   Dec. 23, 2021

(30) Foreign Application Priority Data

Feb. 19, 2021  (CN) .......................... 202110188808.7

(51) Int. Cl.
*G07C 5/10* (2006.01)
*G06T 7/20* (2017.01)
(Continued)

(52) U.S. Cl.
CPC ................. *G07C 5/10* (2013.01); *G06T 7/20* (2013.01); *G06T 7/70* (2017.01); *G07C 5/008* (2013.01);
(Continued)

(58) Field of Classification Search
CPC .......... G01S 17/50; G01S 19/51; G06F 18/22; G07C 5/008; G06T 2207/10028
See application file for complete search history.

(56) References Cited

U.S. PATENT DOCUMENTS

| 2017/0178352 A1* | 6/2017 | Harmsen ................ G05D 1/106 |
| 2017/0369051 A1* | 12/2017 | Sakai ..................... B60W 10/20 |
| 2020/0210715 A1* | 7/2020 | Golomedov ........... G06V 20/56 |

FOREIGN PATENT DOCUMENTS

| CN | 104571111 A | * | 4/2015 |
| CN | 105319540 A |   | 2/2016 |

(Continued)

OTHER PUBLICATIONS

Notice of Reasons for Refusal of corresponding Japanese Patent Application No. 2021-198975, dated Dec. 22, 2022, 10 pages.

(Continued)

*Primary Examiner* — Logan M Kraft
*Assistant Examiner* — Joshua Campbell
(74) *Attorney, Agent, or Firm* — Tucker Ellis LLP

(57) ABSTRACT

The present application discloses a testing method and apparatus for a vehicle perception system, a device and a storage medium, and relates to data processing and, in particular to the field of artificial intelligence such as automatic driving, intelligent transportation, etc. A specific implementation scheme lies in: acquiring an actual speed and a perceptual speed of a test object, where the perceptual speed of the test object is a speed of the test object perceived by the vehicle perception system; determining, according to the actual speed of the test object and the perceptual speed of the test object, speed reporting delay time of the vehicle perception system, where the speed reporting delay time is used to reflect sensitivity of the vehicle perception system to perceive a speed of an obstacle.

16 Claims, 9 Drawing Sheets

Acquiring actual speeds and perceptual speeds of a test object in a test period — S301

Extracting an actual speed corresponding to a point cloud timestamp from the actual speeds of the test object in the test period — S302

Determining speed reporting delay time of a vehicle perception system according to an actual speed of the test object and a perceptual speed of the test object under each point cloud timestamp — S303

(51) Int. Cl.
*G06T 7/70* (2017.01)
*G07C 5/00* (2006.01)

(52) U.S. Cl.
CPC ............... *G06T 2207/10028* (2013.01); *G06T 2207/30261* (2013.01)

(56) References Cited

FOREIGN PATENT DOCUMENTS

| CN | 109194436 | A  | 1/2019  |
|----|-----------|----|---------|
| CN | 109543245 | A  | 3/2019  |
| CN | 110716529 | A  | 1/2020  |
| CN | 111398989 | A1 | 7/2020  |
| CN | 111694287 | A  | 9/2020  |
| EP | 0693185   | A1 | 1/1996  |
| GB | 2547304   | A  | 8/2017  |
| JP | 2000-339600 | A | 12/2000 |
| JP | 2016-197081 | A | 11/2016 |
| JP | 2019-002929 | A | 1/2019  |
| JP | 2020-061125 | A | 4/2020  |
| WO | 2010/139807 | A1 | 12/2010 |
| WO | 2017/180394 | A1 | 10/2017 |
| WO | 2019/092880 | A1 | 5/2019  |
| WO | 2021/019665 | A1 | 2/2021  |

OTHER PUBLICATIONS

Office Action of corresponding European Patent Application No. 21194732.0, dated Feb. 24, 2022, 17 pages.
Office Action of corresponding Chinese Patent Application No. 202110188808.7, dated Feb. 16, 2022, 17 pages.
Notice of Allowance of corresponding Chinese Patent Application No. 202110188808.7, dated Dec. 21, 2022, 10 pages.

* cited by examiner

TESTING METHOD AND APPARATUS FOR VEHICLE PERCEPTION SYSTEM, DEVICE, AND STORAGE MEDIUM

CROSS-REFERENCE TO RELATED APPLICATIONS

This application claims priority to Chinese Patent Application No. 202110188808.7, filed on Feb. 19, 2021, which is hereby incorporated by reference in its entirety.

TECHNICAL FIELD

The present application relates to data processing and, in particular, to a testing method and apparatus for a vehicle perception system, a device, and a storage medium, and can be applied to the field of artificial intelligence, such as automatic driving, intelligent transportation, etc.

BACKGROUND

A vehicle perception system can perceive an obstacle around a vehicle and output various attribute information of the obstacle, such as a location, a category, a speed and the like of the obstacle, which plays an important role in unmanned driving.

At present, when the speed of the obstacle output by the vehicle perception system is evaluated, the evaluation is generally made to evaluation indicators such as a speed magnitude error, a speed direction error, a speed hop rate and the like. However, the vehicle perception system obtained in this way is insensitive to an obstacle moving at a low speed.

SUMMARY

The present application provides a testing method and apparatus for a vehicle perception system, a device, and a storage medium.

According to a first aspect of the present application, a testing method for a vehicle perception system is provided, which includes:
  acquiring an actual speed and an perceptual speed of a test object, where the perceptual speed of the test object is a speed of the test object perceived by the vehicle perception system; and
  determining, according to the actual speed of the test object and the perceptual speed of the test object, speed reporting delay time of the vehicle perception system, where the speed reporting delay time is used to reflect sensitivity of the vehicle perception system to perceive a speed of an obstacle.

According to a second aspect of the present application, a testing apparatus for a vehicle perception system is provided, which includes:
  at least one processor; and
  a memory communicatively connected to the at least one processor; where
  the memory stores instructions executable by the at least one processor, where the instructions are executed by the at least one processor, so that the at least one processor is configured to:
  acquire an actual speed and a perceptual speed of a test object, where the perceptual speed of the test object is a speed of the test object perceived by the vehicle perception system; and
  determine, according to the actual speed of the test object and the perceptual speed of the test object, speed reporting delay time of the vehicle perception system, where the speed reporting delay time is used to reflect sensitivity of the vehicle perception system to perceive a speed of an obstacle.

According to a third aspect of the present application, a non-transitory computer-readable storage medium stored with computer instructions is provided, where the computer instructions are used to enable a computer to:
  acquire an actual speed and a perceptual speed of a test object, where the perceptual speed of the test object is a speed of the test object perceived by a vehicle perception system; and
  determine, according to the actual speed of the test object and the perceptual speed of the test object, speed reporting delay time of the vehicle perception system, where the speed reporting delay time is used to reflect sensitivity of the vehicle perception system to perceive a speed of an obstacle.

It should be understood that the content described in this section is not intended to identify key or important features in the embodiments of the present disclosure, nor is it intended to limit the scope of the present application. Other features of the present application will be easily understood through the following description.

BRIEF DESCRIPTION OF DRAWINGS

The drawings are used to better understand the solutions, and do not constitute a limitation to the present application, where.

DESCRIPTION OF EMBODIMENTS

Exemplary embodiments of the present application are described below with reference to the accompanying drawings, where various details of the embodiments of the present application are included to facilitate understanding, and should be considered as merely exemplary. Therefore, those of ordinary skill in the art should recognize that various changes and modifications can be made to the embodiments described herein without departing from the scope and spirit of the present application. Similarly, for clarity and conciseness, descriptions of well-known functions and structures are omitted in the following description.

In road tests, a problem that a vehicle perception system is insensitive to a speed of an obstacle moving at a low speed is often encountered. For example, an obstacle vehicle B in front of a vehicle A is reversing at a low speed, a vehicle perception system of the vehicle A can perceive the existence of the obstacle vehicle B, but a speed of the obstacle B perceived is 0. The existence of this problem may cause a vehicle collision due to inability of the vehicle to brake in time. Therefore, it is necessary to improve sensitivity of the vehicle perception system to perceive a speed of an obstacle moving at a low speed.

To improve the sensitivity of the vehicle perception system to perceive the speed of the obstacle moving at the low speed, firstly, it is necessary to evaluate the sensitivity of the vehicle perception system to perceive the speed of the obstacle moving at the low speed. However, when a speed of an obstacle output by the vehicle perception system is evaluated, the evaluation is generally made to evaluation indicators such as a speed magnitude error, a speed direction error, a speed hop rate and the like, but there is a lack of evaluation to the sensitivity of the vehicle perception system to perceive a speed of an obstacle moving at a low speed.

The present application provides a testing method and apparatus for a vehicle perception system, a device, and a storage medium, which is applied to the field of data processing, especially in the field of artificial intelligence such as automatic driving, intelligent transportation and the like, so as to realize an evaluation to sensitivity of the vehicle perception system to perceive a speed of an obstacle, and in particular, to realize an evaluation to sensitivity of the vehicle perception system to perceive a speed of an obstacle moving at a low speed.

Figure 1:
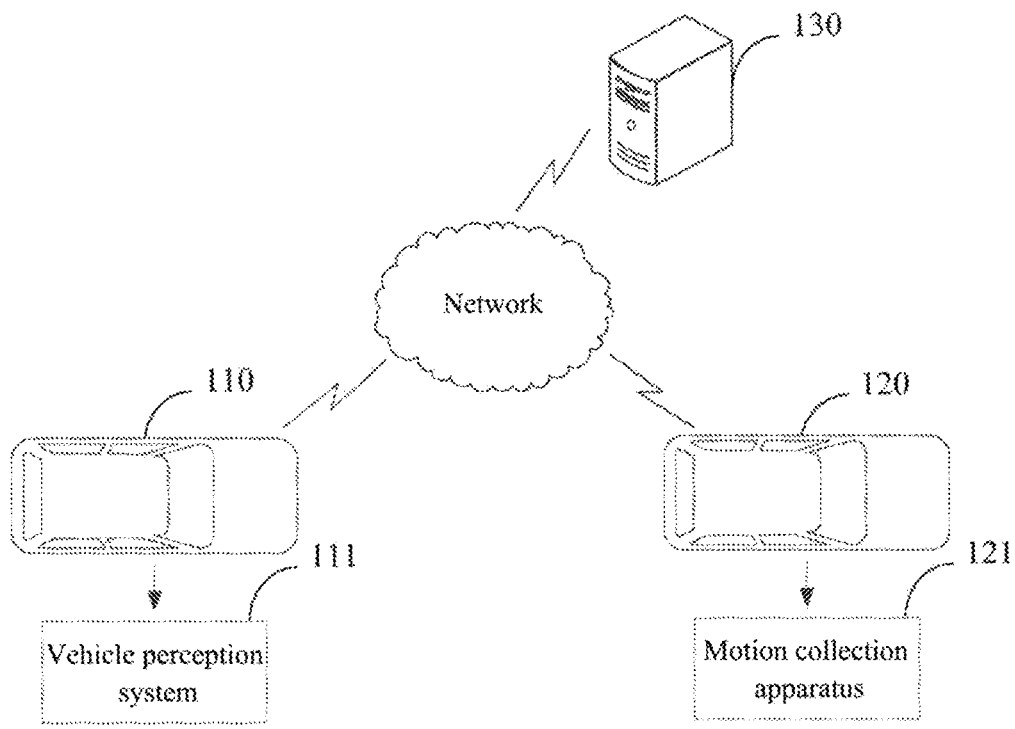
FIG. 1 is a schematic diagram of an application scenario according to an embodiment of the present application.

FIG. 1 is a schematic diagram of an application scenario according to an embodiment of the present application, where the application scenario includes a test scenario.

As shown in FIG. 1, a target vehicle 110 and a test object 120 are included in the test scenario, and the target vehicle 110 is provided with a vehicle perception system 111. The vehicle perception system 111 perceives an obstacle, including perceiving the test object 120. In the test scenario, the test object 120 is provided with a motion collection apparatus 121, which is configured to collect actual motion data of the test object 120.

The test object 120 is an obstacle that is located near the target vehicle 110 (for example, located in front of or on either side of the target vehicle 110) and movable, and in FIG. 1 a vehicle is taken as an example. When the test object 120 is a vehicle, the motion collection apparatus 121 is, for example, a positioning apparatus on the vehicle. When the test object 120 is a vehicle, the target vehicle 110 can be referred to as a master vehicle, and the test object 120 can be referred to as an obstacle vehicle.

In some embodiments, the target vehicle 110 may be an unmanned vehicle, and the test object 120 may also be an unmanned vehicle, so as to realize an evaluation to sensitivity of the vehicle perception system on the unmanned vehicle to perceive a speed of an obstacle, and improve convenience and safety of the evaluation process.

In some embodiments, the target vehicle 110 keeps a communication connection with the test object 120 (in FIG. 1 network communication is taken as an example), and the target vehicle 110 receives the actual motion data of the test object 120 collected by the motion collection apparatus 121, and evaluates, based on perception data from the vehicle perception system 111 and the actual motion data of the test object 120, sensitivity of the vehicle perception system 111 to perceive a speed of the test object 120.

In some embodiments, an electronic device 130 is further included in the test scenario, where the electronic device 130 can receive perception data from the vehicle perception system 111 input by a user and the actual motion data of the test object 120 or the electronic device 130 can keep communication connection (in FIG. 1 network communication is taken as an example) with the target vehicle 110 and the test object 120, and receive the perception data from the vehicle perception system 111 and the actual motion data of the test object 120. The electronic device evaluates the sensitivity of the vehicle perception system to perceive the speed of the test object 120 based on the perception data from the vehicle perception system 111 and the actual motion data of the test object 120.

For example, the electronic device 130 may be a server, a computer, a tablet computer, a mobile phone and other devices. In FIG. 1 an example is taken where the electronic device 130 is a server.

According to an embodiment of the present application, the present application provides a testing method for a vehicle perception system.

Exemplarily, the execution subject of each method embodiment of the present application is, for example, the target vehicle 110 shown in FIG. 1 or the electronic device 130 shown in FIG. 1.

Figure 2:
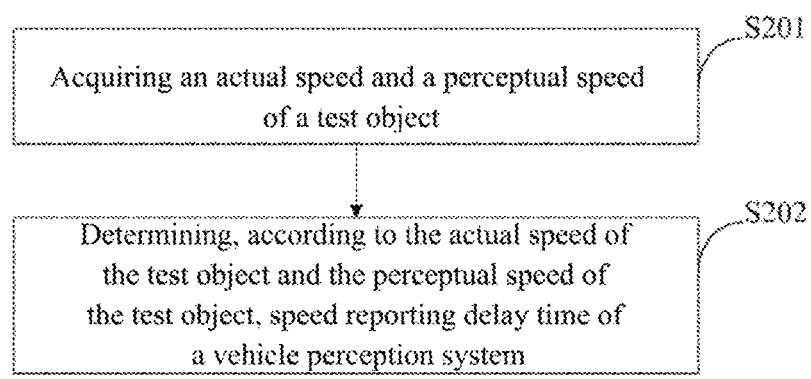
FIG. 2 is a schematic flowchart of a testing method for a vehicle perception system according to an embodiment of the present application.

FIG. 2 is a schematic flowchart of a testing method for a vehicle perception system according to an embodiment of the present application. As shown in FIG. 2, the method includes:

S201, acquiring an actual speed and a perceptual speed of a test object.

The perceptual speed of the test object is a speed of the test object perceived by the vehicle perception system. The vehicle perception system refers to a vehicle perception system of the target vehicle in a test scenario.

In a test period, perception data from the vehicle perception system and actual motion data of the test object are collected to obtain collected data. The perception data from the vehicle perception system includes a speed of an obstacle perceived by the vehicle perception system. The actual motion data of the test object includes an actual speed of the test object.

In the present embodiment, the collected data in the test period can be acquired. For example, the collected data in the test period can be acquired from a database storing the collected data. For another example, the collected data in the test period can be acquired from collected data input by a user. The speed of the test object perceived by the vehicle perception system is acquired from the perception data from the vehicle perception system in the collected data, and the actual speed of the test object is acquired from the actual motion data of the test object in the collected data.

S202, determining speed reporting delay time of the vehicle perception system according to the actual speed of the test object and the perceptual speed of the test object.

The speed reporting delay time is used to reflect sensitivity of the vehicle perception system to perceive a speed of an obstacle, and refers to delay time for the vehicle perception system to accurately perceive the actual speed of the obstacle. The shorter the speed reporting delay time is, the higher the sensitivity of the vehicle perception system to perceive the speed of the obstacle is, and the longer the speed reporting delay time is, the lower the sensitivity of the vehicle perception system to perceive the speed of the obstacle is.

In the present embodiment, a change in the actual speed of the test object and a change in the perceptual speed of the test object within the test period can be obtained respectively according to the actual speed of the test object and the perceptual speed of the test object in the test period. The change in the actual speed of the test object in the test period is compared with the change in the perceptual speed of the test object in the test period, and the speed reporting delay time of the vehicle perception system is determined according to a comparison result.

For example, taking time as an abscissa axis and speed as an ordinate axis, a change curve of the actual speed of the test object in the test period and a change curve of the perceptual speed of the test object in the test period can be drawn. Based on these two change curves, the speed reporting delay time of the vehicle perception system can be fed back.

In the present embodiment, based on the comparison between the actual speed of the test object and the perceptual speed of the test object in the test period, the speed reporting delay time of the vehicle perception system is determined. Through an evaluation indicator such as the speed reporting delay time, evaluation is made to sensitivity of the vehicle perception system to perceive a speed of an obstacle, thereby achieving the evaluation to the sensitivity of the vehicle perception system to perceive the speed of the obstacle and improving the evaluation effect.

Figure 3:
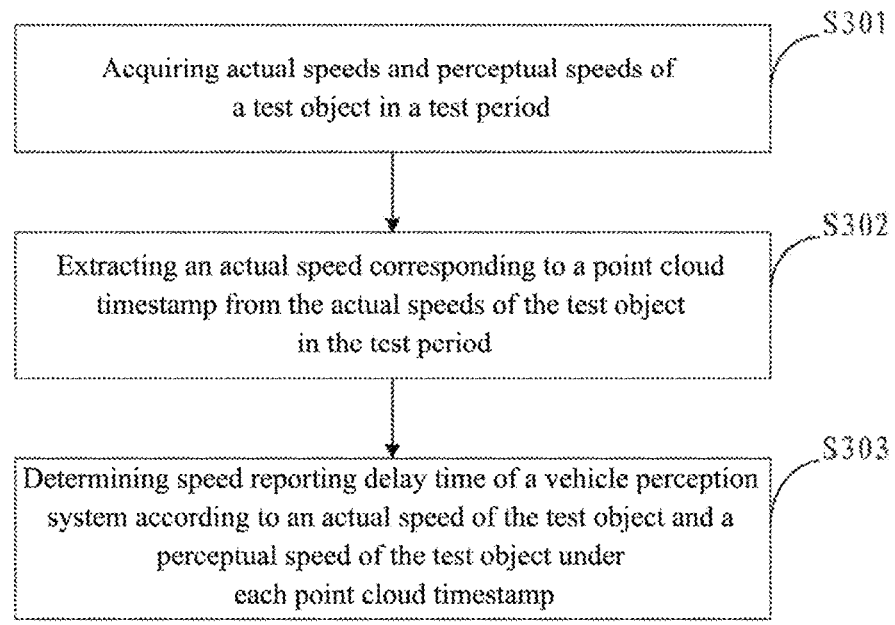
FIG. 3 is a schematic flowchart of the testing method for a vehicle perception system according to another embodiment of the present application.

FIG. 3 is a schematic flowchart of the testing method for a vehicle perception system according to another embodiment of the present application. As shown in FIG. 3, the method includes:

S301, acquiring actual speeds and perceptual speeds of a test object in a test period.

Reference may be made to relevant description of the foregoing embodiment for S301, and details will not be described here again.

S302, extracting an actual speed corresponding to a point cloud timestamp from the actual speeds of the test object in the test period.

Perception data from the vehicle perception system is point cloud data of an obstacle obtained by scanning from the vehicle perception system. Taking a positioning apparatus as an example of a motion collection apparatus on the test object, actual motion data of the test object is positioning data collected by the positioning apparatus. Therefore, a timestamp of the perception data from the vehicle perception system is a point cloud timestamp, and a timestamp of the actual motion data of the test object is a positioning timestamp. In the test period, the vehicle perception system performs one data scan every other point cloud timestamp, and the positioning apparatus performs one data collection every other positioning timestamp.

In the present embodiment, a timestamp of the actual speed of the test object is a positioning timestamp, a timestamp of the perceptual speed of the test object is a point cloud timestamp, and a scanning frequency of the perceptual speed of a vehicle is different from a positioning frequency of the positioning apparatus. In order to improve accuracy of evaluation to sensitivity of the vehicle perception system to perceive an obstacle, a timestamp alignment between the actual speed of the test object and the perceptual speed of the test object can be performed.

The positioning frequency of the positioning apparatus is generally greater than the scanning frequency of the vehicle perception system, that is, the number of positioning timestamps is greater than the number of point cloud timestamps in the same time period. Therefore, in the process of performing the timestamp alignment, for each point cloud timestamp in the test period, positioning timestamps corresponding to multiple actual speeds of the test object are compared with the point cloud timestamp. According to a comparison result, an actual speed corresponding to a positioning timestamp with the smallest time difference from the point cloud timestamp is determined as the actual speed corresponding to the point cloud timestamp, and the actual speed of the test object under each point cloud timestamp is obtained.

S303, determining speed reporting delay time of the vehicle perception system according to an actual speed of the test object and a perceptual speed of the test object under each point cloud timestamp.

In the present embodiment, a perceptual speed of the test object under each point cloud timestamp is obtained from the perceptual speeds of the test object in the test period. Based on the actual speed of the test object and the perceptual speed of the test object under each point cloud timestamp, a change in the actual speed of the test object over the point cloud timestamp and a change in the perceptual speed of the test object over the point cloud timestamp can be obtained respectively. The change in the actual speed of the test object over the point cloud timestamp in the test period is compared with the change in the perceptual speed of the test object over the point cloud timestamp in the test period, and the speed reporting delay time of the vehicle perception system is determined according to a comparison result.

In the present embodiment, the alignment of the point cloud timestamp is performed on the actual speed of the test object in the test period to obtain the actual speed of the test object under each point cloud timestamp. Based on the actual speed of the test object under each point cloud timestamp and the perceptual speed of the test object under each point cloud timestamp, the speed reporting delay time of the vehicle perception system is determined, which realizes evaluation to sensitivity of the vehicle perception system to perceive a speed of an obstacle, and improves accuracy of the evaluation.

In some embodiments, in the test period, the test object starts an accelerated motion from a state in which it moves at a low speed, which facilitates evaluation to sensitivity of the vehicle perception system to perceive a speed of an obstacle moving at a low speed.

In some embodiments, in the test period, the test object starts to move from a stationary state. The test object would go through a low-speed phase in the process of starting to move from the stationary state, which facilitates evaluation to sensitivity of the vehicle perception system to perceive a speed of an obstacle moving at a low speed, and is helpful to improve convenience of the test process. For example, compared with a situation that the test object starts an accelerated motion from a state in which it moves at a low speed, the test object starting to move from a stationary state is helpful to determining start time of the test.

On the basis of the situation that the test object starts to move from a stationary state in the test period, a possible implementation of S303 includes: determining, according to the actual speed of the test object under each point cloud timestamp, a first time when a state of the test object changes from being stationary to moving; determining, according to the perceptual speed of the test object under each point cloud timestamp, a second time when the vehicle perception system perceives that the state of the test object changes from being stationary to moving; and determining a difference between the first time and the second time as the speed reporting delay time of the vehicle perception system to improve accuracy of the speed reporting delay time.

In the present embodiment, the actual speed of the test object under each point cloud timestamp reflects a state change of the test object from being stationary to moving. According to the state change of the test object from being stationary to moving, the first time when the state of the test object changes from being stationary to moving is determined. The perceptual speed of the test object under each point cloud timestamp reflects a state change of the test object from being stationary to moving perceived by the vehicle perception system. According to the state change of the test object from being stationary to moving perceived by the vehicle perception system, the second time when the state of the test object changes from being stationary to moving perceived by the vehicle perception system is determined.

As an example, search for a first actual speed that is not zero, starting from the actual speed of the test object under the first point cloud timestamp; and determine a point cloud timestamp corresponding to the first actual speed that is not zero, or a preceding point cloud timestamp of the point cloud timestamp corresponding to the first actual speed that is not zero to be the first time when the state of the test object changes from being stationary to moving.

When the first actual speed that is not zero is searched, whether the actual speed satisfies a preset condition can be further determined. The preset condition can be, for example, whether multiple successive actual speeds before the actual speed are all zero, and whether none of a plurality of successive actual speeds after the actual speed is zero. If the preset condition is satisfied, a point cloud timestamp corresponding to the actual speed or a preceding point cloud timestamp of the point cloud timestamp corresponding to the actual speed is determined as the first time when the state of the test object changes from being stationary to moving. If the preset condition is not satisfied, proceed with searching for an actual speed that is not zero afterwards, and determine whether the actual speed satisfies the above-described preset condition, thereby improving accuracy of determining state transition of the test object.

For example, if the actual speeds of the test object under the preceding 10 point cloud timestamps are all 0 and none of the actual speeds under the 11-th point cloud timestamp and multiple successive point cloud timestamps after the 11-th point cloud timestamp is 0, the 10-th point cloud timestamp or the 11-th point cloud timestamp can be determined as the first time when the state of the test object changes from being stationary to moving.

As for a procedure to determine, according to perceived speeds of the test object under multiple point cloud timestamps, the second time when the vehicle perception system perceives that the state of the test object changes from being stationary to moving, reference may be made to a procedure to determine, according to actual speeds of the test object under multiple point cloud timestamps, the first time when the state of the test object changes from being stationary to moving, and details will not be described again.

In the present embodiment, when the test object is stationary, the vehicle perception system perceives that the speed of the test object is 0. When the state of the test object changes from being stationary to moving, since the vehicle perception system has an insensitive perception to a speed of an obstacle moving at a low speed, the vehicle perception system perceives that the speed of the test object is not zero till the speed of the test object increases to a certain speed or the motion distance of the test object reaches a certain distance. Therefore, the first time is earlier than the second time. Delay time of the second time relative to the first time reflects the sensitivity of the vehicle perception system to perceive the speed of the test object. The difference between the first time and the second time is determined as the speed reporting delay time of the vehicle perception system.

Figure 4:
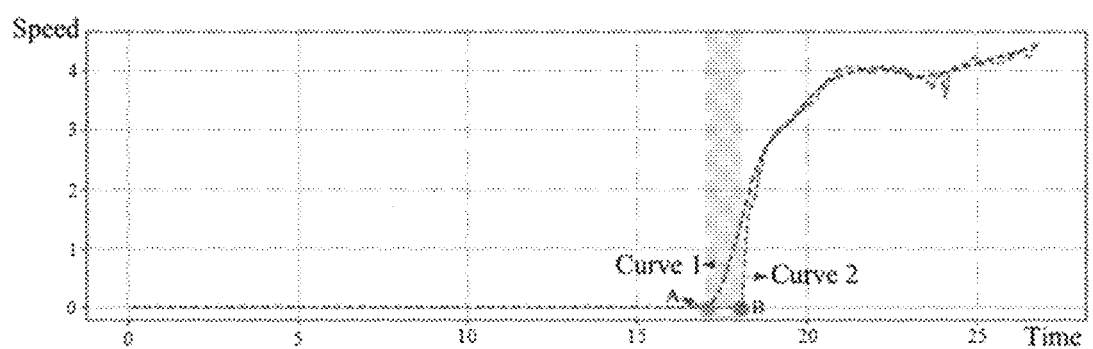
FIG. 4 is an example diagram of a speed change of a test object.

FIG. 4 is an example diagram of a speed change of a test object. As shown in FIG. 4, the horizontal axis represents time and the vertical axis represents speed. Curve 1 is a change curve of an actual speed of the test object, and Curve 2 is a change curve of a perceptual speed of the test object. It can be seen from FIG. 4 that the first time when a state of the test object actually changes from being stationary to moving is the time at point A, and the second time when the vehicle perception system perceives that the state of the test object changes from being stationary to moving is the time at point B.

Figure 5:
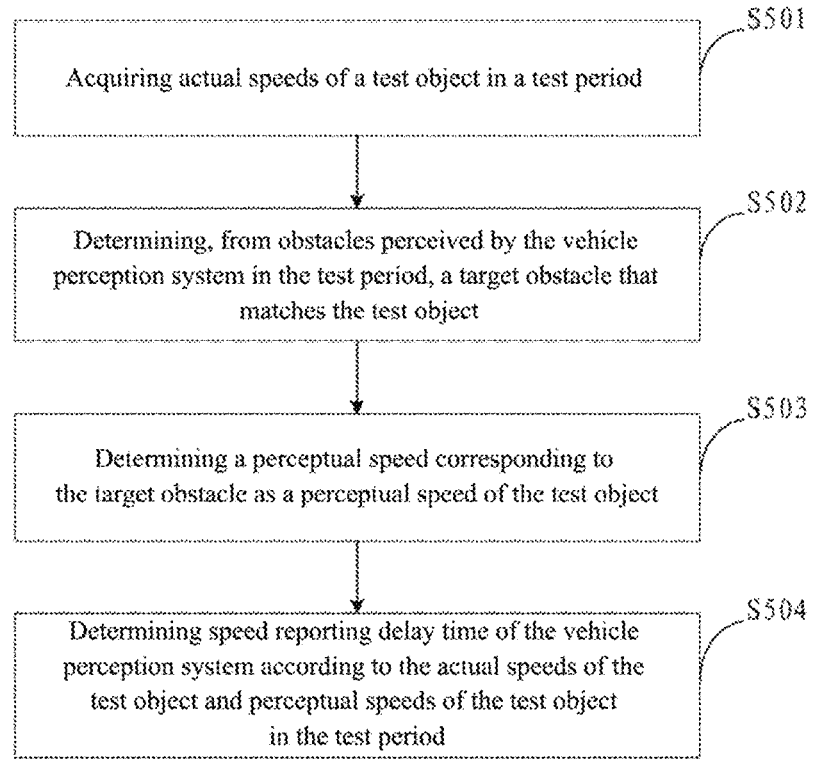
FIG. 5 is a schematic flowchart of the testing method for a vehicle perception system according to another embodiment of the present application.

Considering that the vehicle perception system may perceive multiple obstacles in a test period, when perceptual speeds of a test object in the test period are acquired, it is necessary to determine the perceptual speed of the test object from the perceptual speeds of the multiple obstacles. On this basis, FIG. 5 is a schematic flowchart of the testing method for a vehicle perception system according to another embodiment of the present application. As shown in FIG. 5, the method includes:

S501, acquiring actual speeds of a test object in a test period.

Reference may be made to relevant description of the foregoing embodiments for S501, and details will not be described again.

S502, determining, from obstacles perceived by the vehicle perception system in the test period, a target obstacle that matches the test object.

At each point cloud timestamp in the test period, the vehicle perception system may perceive one or more obstacles. Therefore, for each point cloud timestamp in the test period, a target obstacle that matches the test object can be determined, which improves accuracy of obstacle matching.

In the present embodiment, perception data from the vehicle perception system in the test period is acquired. For each point cloud timestamp, according to the perception data from the vehicle perception system, a target obstacle that matches the test object is determined from the obstacles perceived by the vehicle perception system, and then the target obstacle that matches the test object under each point cloud timestamp is obtained.

As an example, one or more kinds of information of an obstacle, such as type, scale, shape and image, are included in the perception data from the vehicle perception system. One or more kinds of information of the test object, such as type, scale, shape and image, are matched with the one or more kinds of information of the obstacle, such as type, scale, shape and image, to determine the obstacle that matches the test object.

S503, determining a perceptual speed corresponding to the target obstacle as a perceptual speed of the test object.

In the present embodiment, after the target obstacle that matches the test object under each point cloud timestamp is determined, for each point cloud timestamp, a perceptual speed of the target obstacle under the point cloud timestamp can be acquired from the perception data from the vehicle perception system in the test period. The perceptual speed of the target obstacle under the point cloud timestamp is determined as the perceptual speed of the test object under the point cloud timestamp.

S504, determining speed reporting delay time of the vehicle perception system according to the actual speeds of the test object and perceptual speeds of the test object in the test period.

Reference may be made to relevant description of the foregoing embodiments for S504, and details will not be described again.

In the present embodiment, with a full consideration that the vehicle perception system may perceive multiple obstacles, the target obstacle that matches the test object is determined from the multiple obstacles, and the perceptual speed of the target obstacle is determined as the perceptual speed of the test object, which improves accuracy of the perceptual speed of the test object. Based on the actual speed of the test object under each point cloud timestamp and the perceptual speed of the test object under each point cloud timestamp, the speed reporting delay time of the vehicle perception system is determined, thereby improving accuracy of evaluation to sensitivity of the vehicle perception system to perceive a speed of an obstacle.

In some embodiments, the perception data from the vehicle perception system includes a perceptual position of the obstacle, and actual motion data of the test object includes an actual position of the test object. In this case, a possible implementation of S502 includes: extracting, from actual positions of the test object in the test period, an actual position corresponding to a point cloud timestamp; and determining, according to an actual position of the test object under each point cloud timestamp and perceptual positions of the obstacles perceived by the vehicle perception system in the test period, the target obstacle that matches the test object. Therefore, based on the actual position of the obstacle and the actual position of the test object, the obstacle that matches the test object is determined, and matching accuracy is improved.

In the present embodiment, for each point cloud timestamp in the test period, positioning timestamps corresponding to the multiple actual positions of the test object are compared with the point cloud timestamp, according to a comparison result, an actual position corresponding to a positioning timestamp with the smallest time difference from the point cloud timestamp is determined as the actual position corresponding to the point cloud timestamp, and the actual position of the test object under each point cloud timestamp is obtained.

After the actual position of the test object under each point cloud timestamp is obtained, for each point cloud timestamp, the actual position of the test object is compared with the perceptual position of the obstacle, and an obstacle corresponding to the perceptual position closest to the actual position of the test object is determined as the target obstacle that matches the test object, and then the target obstacle under each point cloud timestamp is obtained.

In some embodiments, after the perception data from the vehicle perception system and the actual motion data of the test object in the test period are obtained, a timestamp alignment may be performed between the positioning timestamp of the actual motion data of the test object and the point cloud timestamp of the vehicle perception system, so that the actual position and the actual speed of the test object under the point cloud timestamp are obtained together, thereby improving data processing efficiency.

In the present embodiment, in the test period, for each point cloud timestamp, search, from multiple positioning timestamps, for a positioning timestamp with the smallest time difference from the point cloud timestamp, and determine the positioning timestamp with the smallest time difference from the point cloud timestamp as a positioning timestamp aligned with the point cloud timestamp, and obtain the positioning timestamp aligned with each point cloud timestamp. Determine the actual position and the actual speed of the test object under the positioning timestamp aligned with the point cloud timestamp as the actual position and the actual speed of the test object under the point cloud timestamp. Therefore, the actual position of the test object, the actual speed of the test object, the perceptual position of the test object and the perceptual speed of the test object under each point cloud timestamp are obtained.

The actual position and the actual speed of the test object are, for example, represented by three-dimensional coordinates.

For example, under a point cloud timestamp t1, a perceptual position of a test object is: x=424508.731867, y=4437754.71254, z=55.6573117381, and a perceptual speed of the test object is: x=0.00160855070309, y=−5.04775388835e$^{-0.5}$, z=−0.0222265054689. An actual position of the test object under a positioning timestamp t2 aligned with the point cloud timestamp t1 is: x=45836.47112345771, y=4405632.5315975826, z=15.724603759761891, and an actual speed of the test object is: x=−7.96567188443664, y=−4.9582912563494776, z=0.3515090953359218. In this case, the actual position and the actual speed of the test object under the positioning timestamp t2 can be determined as the actual position and the actual speed of the test object under the point cloud timestamp t1.

In some embodiments, there are multiple test periods. Before the speed reporting delay time of the vehicle perception system is determined, data filtering can be performed on the multiple test periods to improve data quality of collected data in the test periods used to evaluate the speed reporting delay time of the vehicle perception system. At this time, a possible implementation of acquiring the actual speed of the test object in the test period includes: acquiring actual speeds of the test object in multiple test periods, determining whether the actual speeds of the test object in the test periods meet a test requirement, and obtaining the actual speeds of the test object in the test periods if the actual speeds of the test object in the test periods meet the test requirement.

In the present embodiment, whether the actual speed of the test object in each test period meets the test requirement is determined. For a test period when the actual speed of the test object meets the test requirement, the speed reporting delay time of the vehicle perception system may be determined using the actual speed of the test object and the perceptual speed of the test object in the test period, or using the actual position of the test object and the perceptual position of the test object in the test period. For a test period when the actual speed of the test object does not meet the test requirement, the perception data collected by the vehicle perception system and the actual motion data of the test object in the test period are discarded. Therefore, according to the actual speed of the test object in the test period, data filtering is performed on the test period to improve effect and reliability of the data filtering.

In an example, in the test, it may be preset that the test object starts to move from being stationary. Therefore, when data filtering is performed on a test period, it is possible to determine whether the actual speed of the test object in the test period increases from zero. If yes, it is determined that the actual speed of the test object in the test period meets the test requirement, otherwise it is determined that the actual speed of the test object in the test period does not meet the test requirement.

In another example, during the test, it may be preset that the test object moves after being stationary for a preset period of time. Therefore, when data filtering is performed on a test period, it is possible to determine whether the test object remains stationary for consecutive 15 s after the start time of the test period, that is, whether the actual speed of the test object is 0 for consecutive 15 s after the start time of the test period. If yes, it is determined that the actual speed of the test object meets the test requirement, otherwise it is determined that the actual speed of the test object does not meet the test requirement.

Further, when whether the actual speed of the test object in the test period meets the test requirement is determined, the actual speed of the test object in the test period is visualized, for example, a change curve of the actual speed of the test object in the test period is generated. According to a visualization result, it is determined whether the actual speed of the test object meets the test requirement. For example, in the change curve of the actual speed of the test object in the test period, it is detected whether the actual speed of the test object is zero for the first 15 seconds of the test period. Therefore, accuracy of determining whether the actual speed of the test object meets the test requirement is improved.

In some embodiments, in addition to performing data filtering for the test period according to the situation whether the actual speed of the test object meets the test requirement in the test period, data filtering can also be performed for the test period according to the situation whether one or more of the actual position of the test object, the actual speed of the target vehicle, and the actual position of the target vehicle in the test period meets the test requirement. For example, in the test, the target vehicle can be preconfigured to be stationary, so it is possible to detect whether the actual speed of the target vehicle is zero and/or whether the actual position of the target vehicle remains unchanged, and if yes, it is determined that the actual speed and/or the actual position of the target vehicle meets the test requirement. For another example, in the test, a motion trajectory of the test object can be preconfigured, so it is possible to detect whether a motion trajectory formed by the actual positions of the test object meets the preconfigured motion trajectory of the test object, and if yes, it is determined that the actual position of the test object meets the test requirement.

Further, in the process of determining whether one or more of the actual position of the test object, the actual speed of the target vehicle and the actual position of the target vehicle in the test period meet the test requirement, visualization can also be performed on one or more of the actual position of the test object, the actual speed of the target vehicle and the actual position of the target vehicle in the test period. For example, a change trajectory of the actual position of the test object, a change curve of the actual speed of the target vehicle and a change trajectory of the actual position of the target vehicle are generated. Based on the visualization result, it is determined whether one or more of the actual position of the test object, the actual speed of the target vehicle and the actual position of the target vehicle meet the test requirement.

Figure 6A:
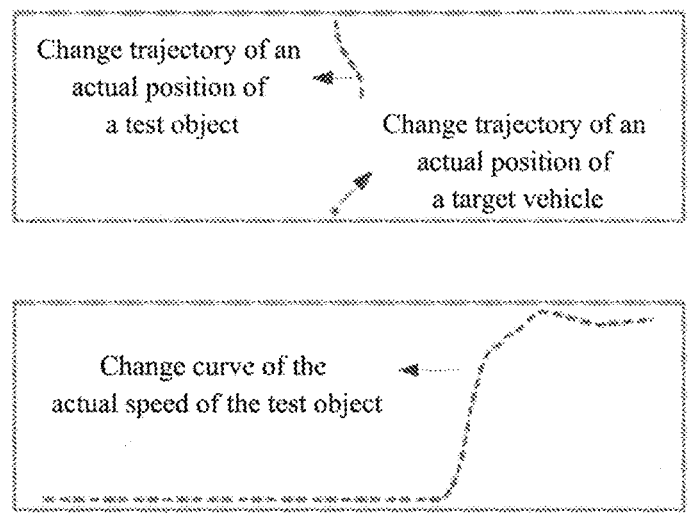
FIG. 6($a$), FIG. 6($b$) and FIG. 6($c$) are example diagrams of visualization of data collected in a test period.
Figure 6B:
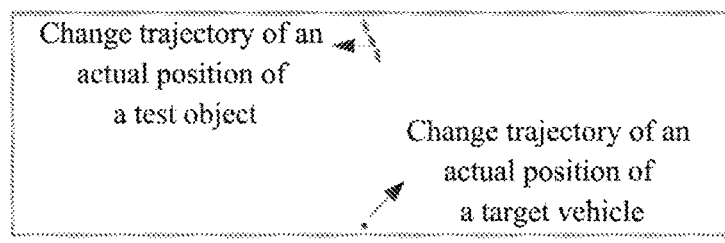
Figure 6B:
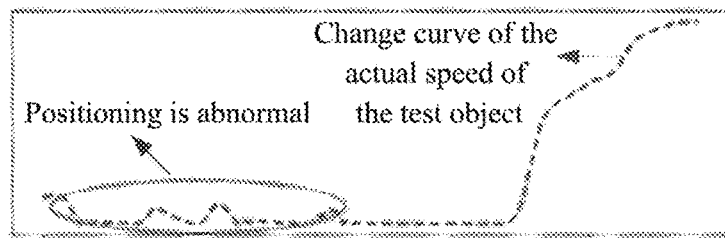
Figure 6C:
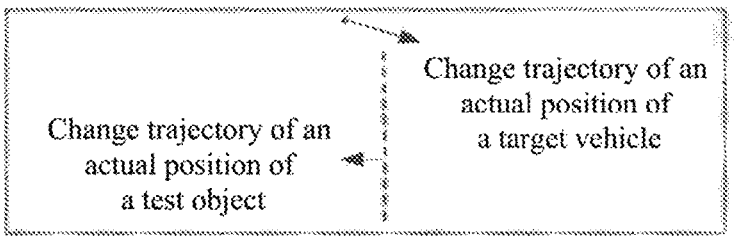
Figure 6C:
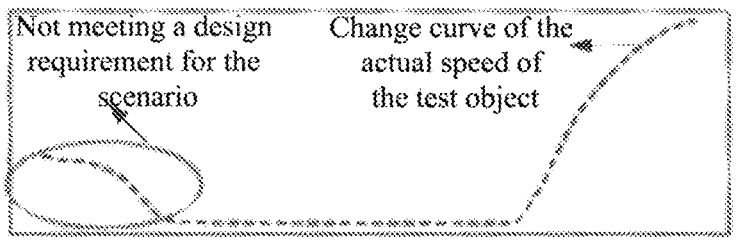

As an example, FIG. 6(a), FIG. 6(b) and FIG. 6(c) are example diagrams of visualization of collected data in test periods. FIG. 6(a), FIG. 6(b) and FIG. 6(c) are diagrams of visualization of collected data in test period a, test period b and test period c, respectively. In FIG. 6(a), the graph located above is a change trajectory of the actual position of the test object and a change trajectory of the actual position of the target vehicle in test period a, and the graph located below is a change curve of the actual speed of the test object in test period a. Reference may be made to the description of the two graphs in FIG. 6(a) for two graphs in FIG. 6(b) and two graphs in FIG. 6(c), and details will not be described here again.

A test requirement on the actual speed is imposed such that the test object first stands still for 15 seconds and then moves, it can be seen from FIG. 6(a), FIG. 6(b) and FIG. 6(c) that the change curve of the actual speed of the test object in test period a meets the test requirement that the test object first stands still for 15 seconds and then moves, while in test period b and test period c the requirement that the test object first stands still for 15 seconds and then moves in the test periods is not meet. As can be seen from FIG. 6(b), positioning data of the test object in test period b is abnormal. As can be seen from FIG. 6(c), the test object in test period c is not stationary at the beginning, which does not conform to the scenario design. Therefore, the collected data in test period a can be used to determine the speed reporting delay time of the vehicle perception system, and test data in test period b and test period c can be discarded.

Figure 7:
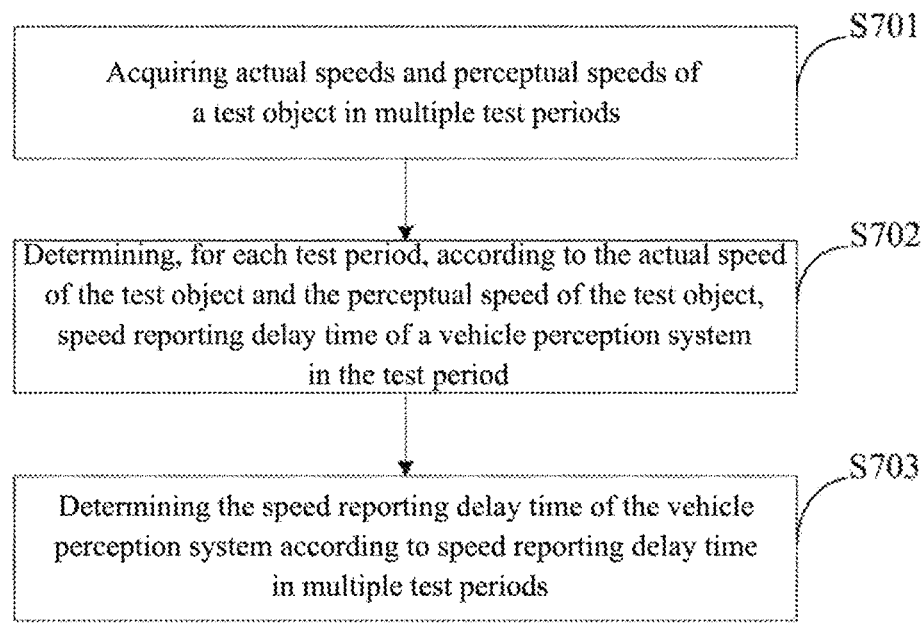
FIG. 7 is a schematic flowchart of the testing method for a vehicle perception system according to another embodiment of the present application.

Based on a situation that there are multiple test periods, FIG. 7 is a schematic flowchart of the testing method for a vehicle perception system according to another embodiment of the present application. As shown in FIG. 7, the method includes:

S701, acquiring actual speeds and perceptual speeds of the test object in multiple test periods.

When the test periods are multiple, a test is performed on the vehicle perception system in each test period, and perception data from the vehicle perception system and actual motion data of the test object are collected.

For example, in a test period, the target vehicle where the vehicle perception system is located remains stationary, the test object starts to move from being stationary in front of or on a side of the target vehicle, and the perception data from the vehicle perception system and the actual motion data of the test object in the test period are collected.

In the present embodiment, when there are multiple test periods, the actual speeds of the test object and the perceptual speeds of the test object in the multiple test periods are acquired from the collected data in the multiple test periods. For the process of acquiring the actual speeds of the test object and the perceptual speeds of the test object in the test periods, reference can be made to relevant description of the foregoing embodiments, and details will not be described here again.

In an implementation, before the actual speeds of the test object and the perceptual speeds of the test object in the multiple test periods are acquired, reference can be made to the descriptions on the foregoing embodiments to perform data filtering on the multiple test periods to acquire the filtered actual speeds of the test object and perceptual speeds of the test object in the multiple test periods, so as to improve quality of data used to determine the speed reporting delay time of the vehicle perception system.

S702, determining, for each test period, according to the actual speed of the test object and the perceptual speed of the test object, speed reporting delay time of the vehicle perception system in the test period.

In the present embodiment, after the actual speeds of the test object and the perceptual speeds of the test object in the multiple test periods are obtained, for each test period, speed reporting delay time of the vehicle perception system in the test period is determined according to the actual speed of the test object and the perceptual speed of the test object in the test period. Therefore, speed reporting delay time of the vehicle perception system in the multiple test periods is obtained. For the process of determining the speed reporting delay time of the vehicle perception system in the test period according to the actual speed of the test object and the perceptual speed of the test object in the test period, reference can be made to relevant descriptions of the foregoing embodiments, and details will not be described here again.

S703, determining the speed reporting delay time of the vehicle perception system according to speed reporting delay time in the multiple test periods.

In the present embodiment, after the speed reporting delay time of the vehicle in the multiple test periods are obtained, the speed reporting delay time of the vehicle perception system can be determined through an integration to the speed reporting delay time of the vehicle in respective test periods. For example, an average can be obtained upon addition of the speed reporting delay time of the vehicle in the respective test periods, or a median is taken, or a mode is taken; and the average, the median or the mode can be determined as the speed reporting delay time of the vehicle perception system.

In the present embodiment, the speed reporting delay time of the vehicle perception system is determined through a test on the vehicle perception system in multiple test periods and an integration to the speed reporting delay time of the vehicle perception system in the multiple test periods. Therefore, reliability and accuracy of the test process are improved, and the amount of data used to determine the speed reporting delay time of the vehicle perception system is increased, thereby improving accuracy of the speed reporting delay time of the vehicle perception system and improving accuracy of evaluation to sensitivity of the vehicle perception system to perceive a speed of an obstacle.

In some embodiments, the multiple test periods belong to different test scenarios, thus a test is carried out in different test scenarios for the vehicle perception system, which improves comprehensiveness of the test; moreover, in combination with collected data in multiple test periods in different test scenarios, evaluation is made to sensitivity of the vehicle perception system to perceive a speed of an obstacle, which improves the accuracy of the evaluation.

In the test process, multiple different test scenarios can be configured. In different test scenarios, motion processes of the test object are different, and/or relative positions of the test object to the target vehicle where the vehicle perception system is located are different. Multiple tests can be performed in each test scenario, and collected data in multiple test periods in each test scenario can be obtained.

Based on the situation that the multiple test periods belong to different test scenarios, a possible implementation of S703 includes: determining, for each test scenario, according to the speed reporting delay time in the test period belonging to the test scenario, speed reporting delay time of the vehicle perception system in the test scenario; and determining, according to the speed reporting delay time of the vehicle perception system in each test scenario, the speed reporting delay time of the vehicle perception system.

In the present embodiment, after the speed reporting delay time of the vehicle perception system in the multiple test periods is determined, for each test scenario, an integration can be carried out to the speed reporting delay time in each test period belonging to this test scenario, for example, an average is taken, a median is taken or a mode is taken, to obtain the speed reporting delay time of the vehicle perception system in this test scenario. After the speed reporting delay time of the vehicle perception system in multiple test scenarios is obtained, the speed reporting delay time of the vehicle perception system can be obtained through a combination of the speed reporting delay time of the vehicle perception system in the multiple test scenarios.

Therefore, by means of performing a test in multiple test periods in multiple test scenarios, comprehensiveness and reliability of the test are improved, the amount of data used to determine the speed reporting delay time of the vehicle perception system is increased, thereby improving the accuracy of the speed reporting delay time of the vehicle perception system and improving accuracy of evaluation to sensitivity of the vehicle perception system to perceive a speed of an obstacle.

In some embodiments, when multiple test periods belong to different test scenarios, considering that data collection in a training phase may cause collected data being stored in the same database, a possible implementation of acquiring the actual speed and the perceptual speed of the test object in a test period includes: acquiring, according to a preset corresponding relationship between the test scenario and the test period, from collected data in the multiple test scenarios, actual speeds of the test object and perceptual speeds of the test object in each test period.

In the present embodiment, the preset corresponding relationship between the test scenario and the test period includes one or more test periods corresponding to each test scenario, where the test period is represented by, for example, a start time and an end time. In the collected data in the multiple test scenarios, collection start time and collection end time of each group of collected data are recorded. Therefore, each test period in each test scenario can be acquired first, and then each test period is compared to the collection start time and the collection end time of each group of the collected data to obtain the collected data in each test period, and then the actual speed of the test object and the perceptual speed of the test object are acquired from the collected data in the test period.

In some embodiments, multiple test scenarios belong to different scenario categories. Therefore, a possible implementation of determining the speed reporting delay time of the vehicle perception system according to the speed reporting delay time of the vehicle perception system in each test scenario includes: determining, for each scenario category, according to speed reporting delay time in the test scenario belonging to the scenario category, speed reporting delay time of the vehicle perception system under the scenario category; and determining, according to the speed reporting delay time of the vehicle perception system under each scenario category, the speed reporting delay time of the vehicle perception system.

In a test process, different scenario categories can be configured, where multiple test scenarios are provided for each scenario category, and multiple tests are performed in each test scenario. Therefore, in the test process, collected data in multiple test periods in multiple test scenarios under different scenario categories are collected.

In the present embodiment, the speed reporting delay time of the vehicle perception system in the multiple test periods can be determined first, and based on the speed reporting delay time of the vehicle perception system in the multiple test periods and the test scenarios to which the multiple test periods belong, the speed reporting delay time of the vehicle perception system in the multiple test scenarios is determined. For a specific implementation process, reference can be made to the description of the foregoing embodiments, and details will not be described again.

After the speed reporting delay time of the vehicle perception system in the multiple test scenarios is obtained, for each scenario category, an integration may be made to the speed reporting delay time of each test scenario belonging to the scenario category, for example, an average is taken, a median is taken or a mode is taken, to obtain the speed reporting delay time of the vehicle perception system under the scenario category. After that, the speed reporting delay time of the vehicle perception system can be obtained through a combination of the speed reporting delay time of the vehicle perception system under respective scenario categories.

In some embodiments, the scenario categories include a vertical scenario and a horizontal scenario, thus the speed reporting delay time of the vehicle perception system in the vertical scenario and the horizontal scenario can be obtained, and an evaluation on sensitivity of the vehicle perception system to perceive speeds of an obstacle in a vertical scenario and a horizontal scenario is realized.

The orientation of the target vehicle in the vertical scenario where the vehicle perception system is located is the same as the orientation of the test object, and the orientation of the target vehicle in the horizontal scenario is different from the orientation of the test object. When the test object is a test vehicle, the orientation of the target vehicle being the same as the orientation of the test object means that the orientation of the front of the target vehicle is the same as the orientation of the front of the test vehicle, or the body of the target vehicle and the body of the test vehicle are parallel to each other. The orientation of the target vehicle being different from the orientation of the test object means that the body of the target vehicle and the body of the test vehicle are perpendicular to each other or inclined to each other.

In an implementation, the vertical scenario includes one or more test scenarios of a preceding vehicle starting scenario, a preceding vehicle reversing scenario, and a roadside vehicle forward-merging scenario, thereby covering a variety of road scenarios.

In the preceding vehicle starting scenario, the test object is located in front of the target vehicle and the test object starts to drive forward; in the preceding vehicle reversing scenario, the test object is located in front of the target vehicle and the test object starts to reverse backwards; in the roadside vehicle forward-merging scenario, the test object is located on the roadside in front of the target vehicle, and the test object starts forward and merges into the lane where the target vehicle is located.

In an implementation, the horizontal scenario includes one or more test scenarios of an obstacle vehicle U-turn scenario, an intersection vehicle merging scenario, and a roadside vehicle reversing and merging scenario, thus covering a variety of road scenarios.

In the obstacle vehicle U-turn scenario, the test object acts as the obstacle vehicle, the test object is located in front of the target vehicle and the test object makes a U-turn and drives away; in the intersection vehicle merging scenario, the test object drives forward or reverses from an intersection and passes the lane where the target vehicle is located; in the roadside vehicle reversing and merging scenario, the test object is located on the roadside in front of the target vehicle, and the test object reverses and merges into the lane where the target vehicle is located.

Figure 8:
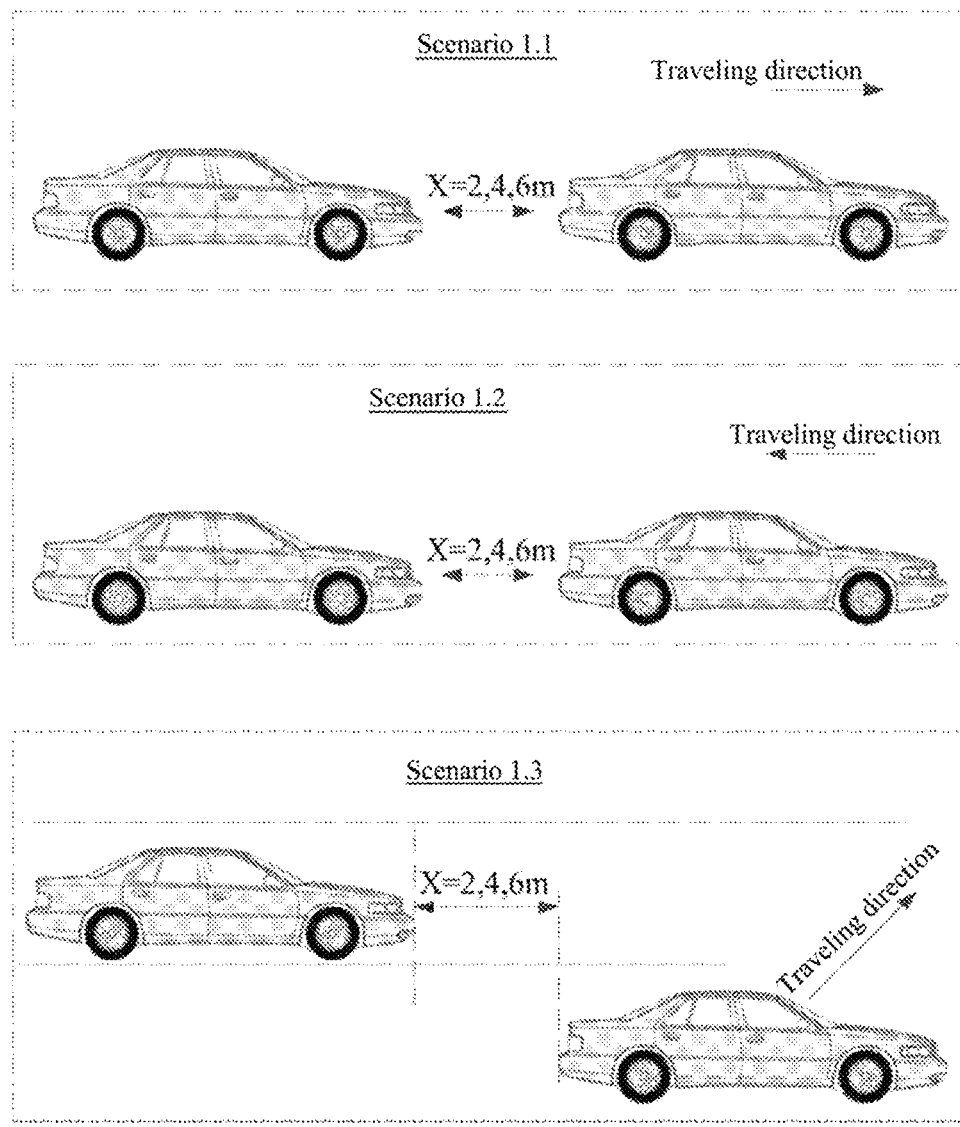
FIG. 8 is an example scenario diagram of multiple test scenarios in a vertical scenario.
Figure 9:
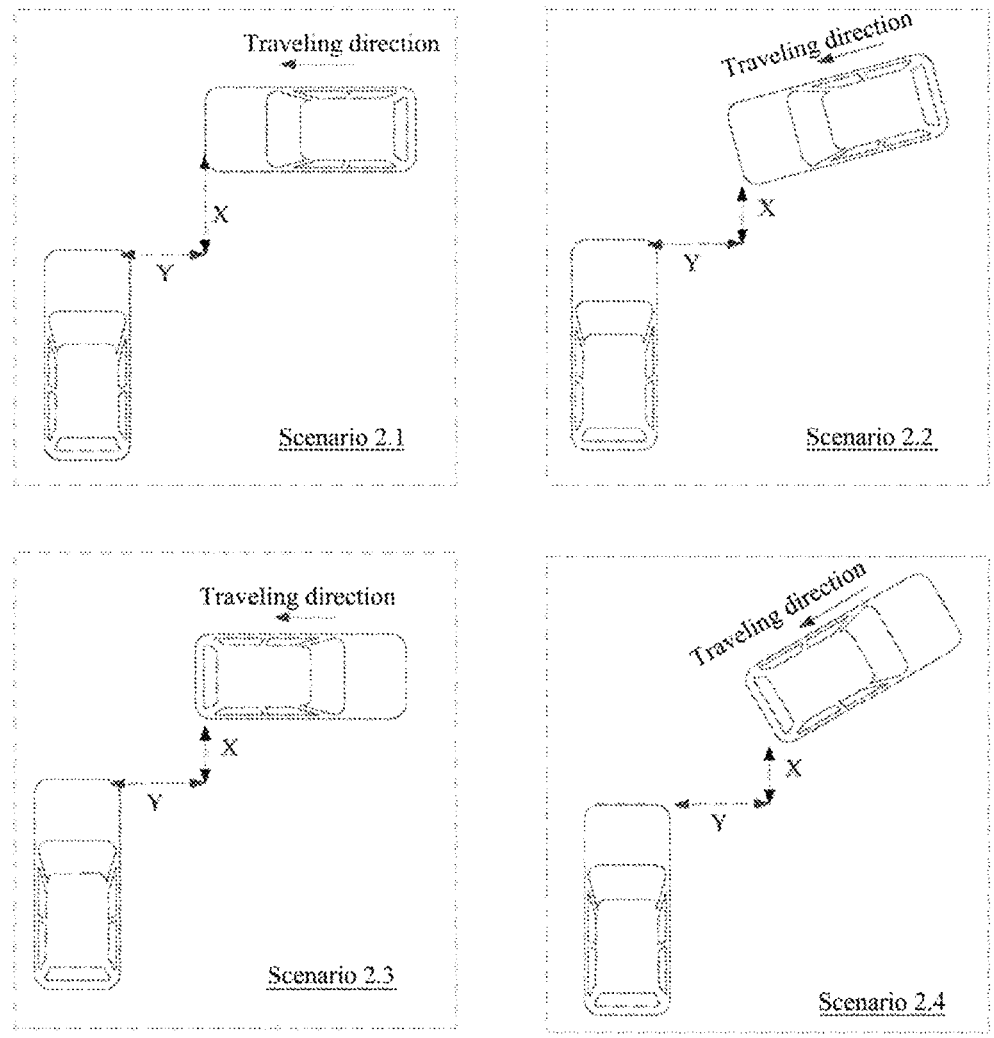
FIG. 9 is an example scenario diagram of the multiple test scenarios in a horizontal scenario.

As an example, FIG. 8 is an example scenario diagram of multiple test scenarios in a vertical scenario, and FIG. 9 is an example scenario diagram of multiple test scenarios in a horizontal scenario, taking the test object being a test vehicle as an example. As shown in FIG. 8, the vertical scenario includes Scenario 1.1, Scenario 1.2 and Scenario 1.3. Scenario 1.1 is a preceding vehicle starting scenario, Scenario 1.2 is a preceding vehicle reversing scenario and Scenario 1.3 is a roadside vehicle forward-merging scenario. The following table is scenario descriptions on Scenario 1.1, Scenario 1.2 and Scenario 1.3. As shown in FIG. 9, the horizontal scenario includes Scenario 2.1, Scenario 2.2, Scenario 2.3 and Scenario 2.4. Scenario 2.1 and Scenario 2.2 are intersection vehicle merging scenarios, Scenario 2.3 is a roadside vehicle reversing and merging scenario, and Scenario 2.4 can be interpreted as an obstacle vehicle U-turn scenario or a roadside vehicle reversing and merging scenario.

Figure 10:
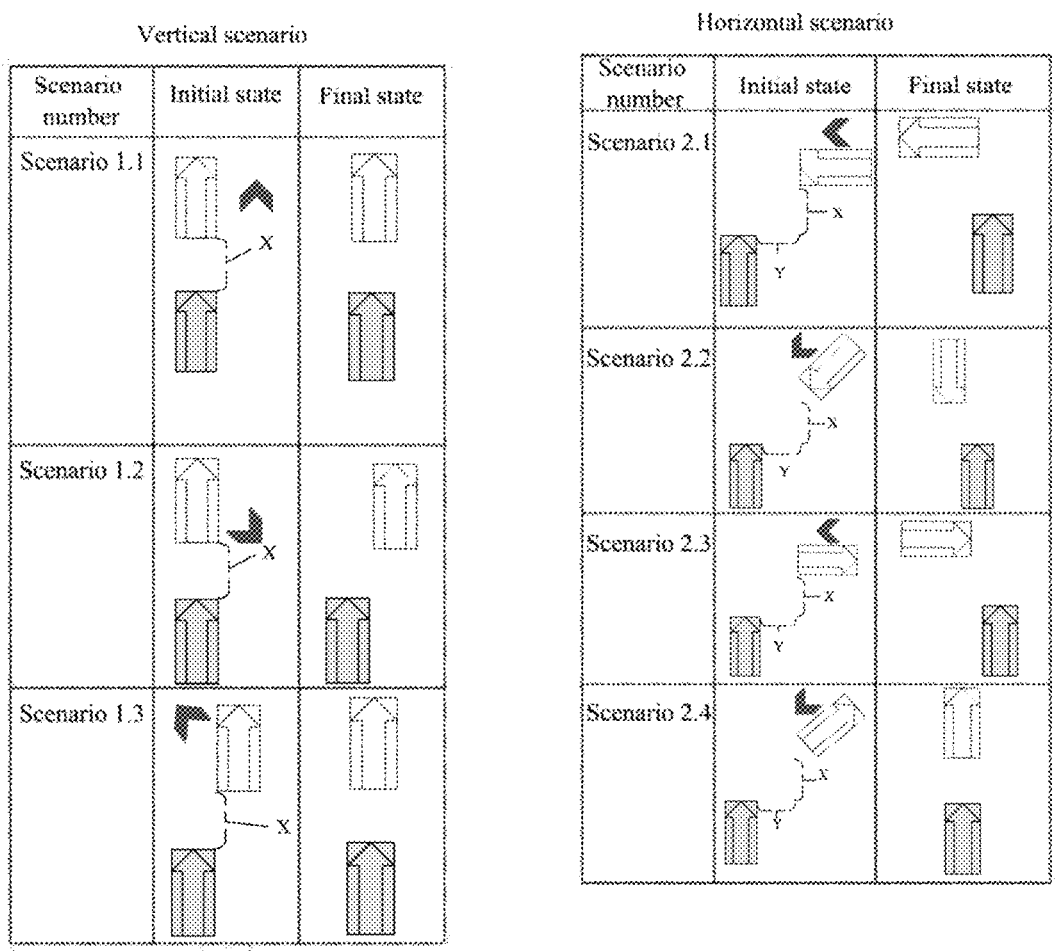
FIG. 10 is an example diagram of initial states and final states of relative positions of a test vehicle and a target vehicle in a vertical scenario and a horizontal scenario.

FIG. 10 is an example diagram of initial states and final states of relative positions of the test vehicle and the target vehicle in a vertical scenario and a horizontal scenario. Scenario 1.1, Scenario 1.2 and Scenario 1.3 can be understood in conjunction with FIG. 8, FIG. 10 and Table 1 below; and Scenario 2.1, Scenario 2.2, Scenario 2.3 and Scenario 2.4 can be understood in conjunction with FIG. 9, FIG. 10 and Table 2 below.

Taking Scenario 1.1 in FIG. 8 as an example, the test vehicle starts from positions with a distance of 2, 4, and 6 m (meters) from the target vehicle respectively, and multiple tests are performed. For example, in a first test in Scenario 1.1, the test vehicle starts to travel from a position with 2 m in front of the target vehicle, and in a second test in Scenario 1.1, the test vehicle starts to travel from a position with 4 m in front of the target vehicle. Here, Scenario 1.2 and Scenario 1.3 in FIG. 8 can be described with reference to the examples in Scenario 1.1, for which examples are not given one by one.

Taking Scenario 2.1 in FIG. 9 as an example, the test vehicle starts to pull out from a relative position (X, Y) to the target vehicle, and multiple tests are performed. For example, in a first test in Scenario 2.1, the test vehicle starts to pull out from a relative position (2, 0) to the target vehicle. In a second test in Scenario 2.1, the test vehicle starts to pull out from a relative position (2, 3) to the target vehicle. Here, Scenario 2.2, Scenario 2.3 and Scenario 2.4 in FIG. 8 can be described with reference to the examples in Scenario 1.1, for which examples are not given one by one.

TABLE 1

(vertical scenario)

| Scenario No. | Scenario | Remarks |
|---|---|---|
| Scenario 1.1 | Preceding vehicle starting<br>X = 2, 4, 6<br>(a relative distance between the test vehicle and the target vehicle in a start state is indicated by X) | 1. Mark 2, 4, 6 and 10-meter lines in front of the target vehicle on the ground in advance;<br>2. Record the start time, and the test vehicle starts to travel from being stationary from the 2, 4 and 6-meter lines;<br>3. Record the stop time after the test vehicle travels past the 10-meter line; and<br>4. After the stop time is recorded, the test vehicle brakes. |
| Scenario 1.2 | Preceding vehicle reversing<br>X = 10, 20, 30 | 1. Mark 10, 20 and 30-meter lines in front of the target vehicle on the ground in advance;<br>2. Record the start time, and the test vehicle performs a parallel parking from 10, 20 and 30-meter lines;<br>3. After the body of the test vehicle is straightened, record the stop time; and<br>4. After the stop time is recorded, the test vehicle brakes. |
| Scenario 1.3 | Roadside vehicle forward-merging<br>X = 10, 20, 30 | 1. Mark 10, 20 and 30-meter lines in front of the target vehicle on the ground in advance;<br>2. Record the start time, and the test vehicle performs a roadside merging from the 10, 20 and 30-meter lines;<br>3. After the body of the test vehicle is straightened, record the stop time; and<br>4. After the stop time is recorded, the test vehicle brakes. |

TABLE 2

(horizontal scenario)

| Scenario No. | Scenario | Remarks |
|---|---|---|
| Scenario 2.1 | Lateral vehicle pulling out<br>X = 10, 20, 30; Y = 0, 3<br>(a relative position between the test vehicle and the target vehicle in an initial state is indicated by X and Y) | 1. Mark 10, 20 and 30-meter lines in front of and a 3-meter line in the right of the target vehicle on the ground in advance;<br>2. Record the start time, and from a position of (X, Y) relative to the target vehicle, the test vehicle starts to travel from being stationary;<br>3. After the tail of the test vehicle travels past the target vehicle, record the stop time; and<br>4. After the stop time is recorded, the test vehicle brakes. |
| Scenario 2.2 | Lateral vehicle pulling out<br>X = 10, 20, 30; Y = 0, 3 | 1. Mark 10, 20 and 30-meter lines in front of and a 3-meter line in the right of the target vehicle on the ground in advance;<br>2. Record the start time, and from a position of (X, Y) relative to the target vehicle, the test vehicle merges;<br>3. After the body of the test vehicle is straightened, record the stop time; and<br>4. After the stop time is recorded, the test vehicle brakes. |
| Scenario 2.3 | Lateral vehicle reversing<br>X = 10, 20, 30; Y = 0, 3 | 1. Mark 10, 20 and 30-meter lines in front of and a 3-meter line in the right of the target vehicle on the ground in advance;<br>2. Record the start time, and from a position of (X, Y) relative to the target vehicle, the test vehicle reverses;<br>3. After the tail of the test vehicle travels past the target vehicle, record the stop time; and<br>4. After the stop time is recorded, the test vehicle brakes. |
| Scenario 2.4 | Lateral vehicle reversing<br>X = 10, 20, 30; Y = 0, 3 | 1. Mark 10, 20 and 30-meter lines in front of and a 3-meter line in the right of the target vehicle on the ground in advance;<br>2. Record the start time, and from a position of (X, Y) relative to the target vehicle, the test vehicle reverses and merges; |

TABLE 2-continued (horizontal scenario)

| Scenario No. | Scenario | Remarks |
|---|---|---|
| | | 3. After the body of the test vehicle is straightened, record the stop time; and |
| | | 4. After the stop time is recorded, the test vehicle brakes. |

In the test process, for example, reference can be made to the description of FIG. 10, Table 1 and Table 2 for arrangement of a test scenario, set initial relative positions of the test vehicle and the target vehicle, and then control the target vehicle to be stationary and the test vehicle to move, and record the start time and the stop time, and in each test scenario, obtain multiple test periods and collected data in multiple test periods.

According to an embodiment of the present application, the present application further provides a testing apparatus for a vehicle perception system.

Figure 11:
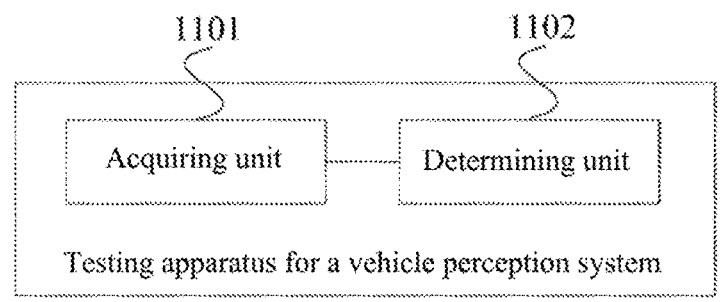
FIG. 11 is a schematic structural diagram of a testing apparatus for a vehicle perception system according to an embodiment of the present application.

FIG. 11 is a schematic structural diagram of a testing apparatus for a vehicle perception system according to one embodiment of the present application. As shown in FIG. 11, the apparatus includes:

an acquiring unit 1101, configured to acquire an actual speed and a perceptual speed of a test object, where the perceptual speed of the test object is a speed of the test object perceived by the vehicle perception system; and a determining unit 1102, configured to determine, according to the actual speed of the test object and the perceptual speed of the test object, speed reporting delay time of the vehicle perception system, where the speed reporting delay time is used to reflect sensitivity of the vehicle perception system to perceive a speed of an obstacle.

In a possible implementation, the determining unit 1102 includes:

a speed extracting module, configured to extract an actual speed corresponding to a point cloud timestamp from actual speeds of the test object in a test period; and a first determining module, configured to determine, according to an actual speed of the test object and a perceptual speed of the test object under each point cloud timestamp, the speed reporting delay time of the vehicle perception system.

In a possible implementation, the first determining module includes:

a first time determining module, configured to determine, according to the actual speed of the test object under each point cloud timestamp, a first time when a state of the test object changes from being stationary to moving;

a second time determining module, configured to determine, according to the perceptual speed of the test object under each point cloud timestamp, a second time when the vehicle sensing system perceives that the state of the test object changes from being stationary to moving; and a first determining sub-module, configured to determine a difference between the first time and the second time as the speed reporting delay time of the vehicle perception system.

In a possible implementation, the acquiring unit 1101 includes:

an obstacle matching module, configured to determine, from obstacles perceived by the vehicle perception system in a test period, a target obstacle that matches the test object; and a perceptual speed determining module, configured to determine a perceptual speed corresponding to the target obstacle as the perceptual speed of the test object.

In a possible implementation, the obstacle matching module includes:

a position extracting module, configured to extract an actual position corresponding to a point cloud timestamp from actual positions of the test object in the test period; and an obstacle matching sub-module, configured to determine, according to the actual position of the test object under each point cloud timestamp and perceptual positions of the obstacles perceived by the vehicle perception system in the test period, the target obstacle that matches the test object.

In a possible implementation, the acquiring unit 1101 includes:

an actual speed acquiring module, configured to acquire actual speeds of the test object in multiple test periods; and an actual speed filtering module, configured to determine whether the actual speeds of the test object in the test periods meet a test requirement, and obtain the actual speeds of the test object in the test periods, if the actual speeds of the test object in the test periods meet the test requirement.

In a possible implementation, there are multiple test periods, and the determining unit 1102 includes:

a second determining module, configured to determine, for each test period, according to the actual speed of the test object and the perceptual speed of the test object, speed reporting delay time of the vehicle perception system in the test period; and a third determining module, configured to determine, according to speed reporting delay time in the multiple test periods, the speed reporting delay time of the vehicle perception system.

In a possible implementation, the multiple test periods belong to different test scenarios, and the third determining module includes:

a scenario delay time determining module, configured to determine, for each test scenario, according to the speed reporting delay time in the test period belonging to the test scenario, speed reporting delay time of the vehicle perception system in the test scenario; and a third determining sub-module, configured to determine, according to the speed reporting delay time of the vehicle perception system in each test scenario, the speed reporting delay time of the vehicle perception system.

In a possible implementation, the multiple test scenarios belong to different scenario categories, and the third determining sub-module is specifically configured to:

determine, for each scenario category, according to speed reporting delay time of the vehicle perception system in the test scenario belonging to the scenario category, the speed reporting delay time of the vehicle perception system under the scenario category.

In a possible implementation, the acquiring unit 1101 includes:

a data dividing module, configured to obtain, according to a preset corresponding relationship between the test scenario and the test period, actual speeds of the test object and perceptual speeds of the test object in each test period from collected data in the multiple test scenarios.

The testing apparatus for the vehicle perception system provided in FIG. 11 can execute the foregoing corresponding method embodiments, and implementation principles and technical effects therebetween are similar, which will not be repeated here.

According to embodiments of the present application, the present application further provides an electronic device and a readable storage medium.

According to the embodiments of the present application, the present application further provides a computer program product, and the computer program product includes: a computer program, where the computer program is stored in a readable storage medium, at least one processor of an electronic device can read the computer program from the readable storage medium, and the at least one processor executes the computer program to enable the electronic device to execute the solution provided in any one of the above-described embodiments.

According to an embodiment of the present application, the present application further provides an autonomous vehicle, and the autonomous vehicle includes: at least one processor, and a memory communicatively connected to the at least one processor; the memory stores instructions executable by the at least one processor, and the instructions are executed by the at least one processor, so that the at least one processor is capable of executing the solution provided in any one of the above-described embodiments.

Figure 12:
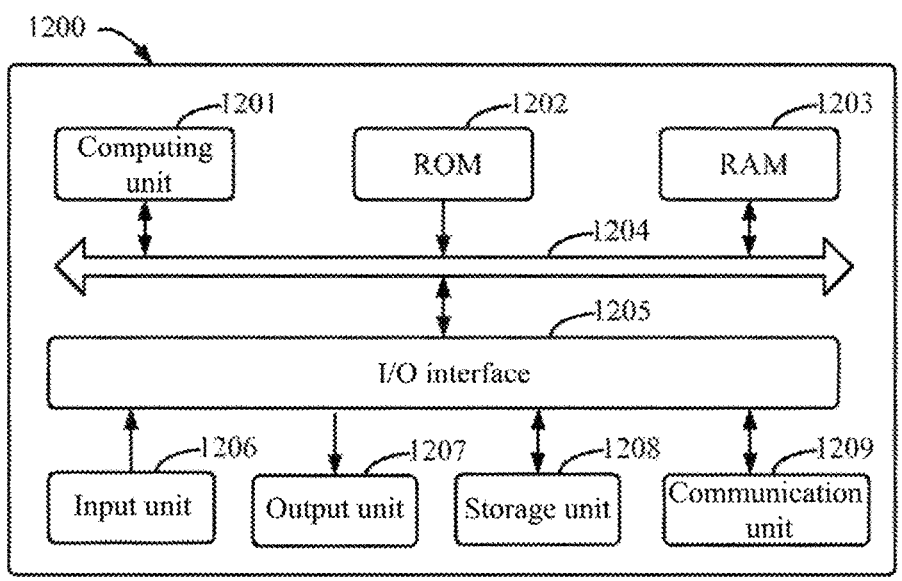
FIG. 12 shows a schematic block diagram of an exemplary electronic device 1200 that can be used to implement an embodiment of the present application.

FIG. 12 shows a schematic block diagram of an example electronic device 1200 that can be used to implement embodiments of the present application. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as a personal digital assistant, a cellular phone, a smart phone, a wearable device and other similar computing apparatus. The components shown herein as well as their connections and relationships and their functions are merely examples, and are not intended to limit the implementation of the present application described and/or claimed herein.

As shown in FIG. 12, the electronic device 1200 includes a computing unit 1201, which can execute various appropriate actions and processing, according to a computer program stored in a read-only medium (ROM) 1202 or a computer program loaded from a storage unit 1208 into a random access memory (RAM) 1203. In the RAM 1203, various programs and data required for the operation of the device 1200 can also be stored. The computing unit 1201, the ROM 1202 and the RAM 1203 are connected to each other through a bus 1204. The input/output (I/O) interface 1205 is also connected to the bus 1204.

Multiple components in the device 1200 are connected to the I/O interface 1205, including: an input unit 1206, such as a keyboard, a mouse, etc.; an output unit 1207, such as various types of displays, speakers, etc.; a storage unit 1208, such as a disk, an optical disk, etc.; and a communication unit 1209, such as a network card, a modem, a wireless communication transceiver, etc. The communication unit 1209 allows the device 1200 to exchange information/data with other devices through a computer network such as the Internet and/or various telecommunication networks.

The computing unit 1201 may be various general-purpose and/or special-purpose processing components with processing and computing capabilities. Some examples of the computing unit 1201 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processors, controllers, microcontrollers, etc. The computing unit 1201 executes the various methods and processing described above, such as a testing method for a vehicle perception system. For example, in some embodiments, the testing method for a vehicle perception system may be implemented as a computer software program, which is tangibly contained in a machine-readable medium, such as the storage unit 1208. In some embodiments, part or all of the computer program may be loaded and/or installed on the device 1200 via the ROM 1202 and/or the communication unit 1209. When the computer program is loaded into the RAM 1203 and executed by the computing unit 1201, one or more steps of the testing method for a vehicle perception system described above can be executed. Alternatively, in other embodiments, the computing unit 1201 may be configured to execute the testing method for a vehicle perception system in any other suitable manner (for example, by means of firmware).

The various embodiments of the systems and techniques described above herein may be implemented in digital electronic circuit systems, integrated circuit systems, field programmable gate arrays (FPGA), application specific integrated circuit (ASIC), application specific standard products (ASSP), system on chips (SOC), complex programmable logic devices (CPLD), computer hardware, firmware, software, and/or combinations thereof. These various implementations may include: being implemented in one or more computer programs that can be executed and/or interpreted on a programmable system including at least one programmable processor. The programmable processor may be a special or general programmable processor, and can receive data and instructions from a storage system, at least one input apparatus and at least one output apparatus, and transmit data and instructions to the storage system, the at least one input apparatus and the at least one output apparatus.

The program codes used to implement the method of the present application can be written in any combination of one or more programming languages. These program codes can be provided to processors or controllers of general-purpose computers, special-purpose computers, or other programmable data processing devices, so that when the program codes are executed by the processors or controllers, the functions/the operations specified in the flowcharts and/or the block diagrams are implemented. The program codes can be executed entirely on a machine, partly on a machine, as an independent software package, partly executed on a machine and partly executed on a remote machine, or entirely executed on a remote machine or a server.

In the context of the present application, a machine-readable medium may be a tangible medium, which may contain or store a program for the instruction execution system, apparatus, or device to use or to be used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include electrical connections based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above content.

To provide interaction with users, the systems and techniques described herein can be implemented on a computer which has: a display device (e.g., a CRT (cathode ray tube) or LCD (liquid crystal display) monitor) for displaying information to users; as well as a keyboard and a pointing apparatus (e.g., a mouse or a trackball) through which users can provide inputs to the computer. Other kinds of apparatuses can also be used to provide interaction with users, for example, a feedback provided to a user can be any form of sensory feedback (e.g., visual feedback, auditory feedback, or tactile feedback); and can receive inputs from users in any form (including acoustic input, voice input or tactile input).

The systems and techniques described herein can be implemented in a computing system including background components (e.g., as a data server), or a computing system including middleware components (e.g., an application server), or a computing system including front-end components (e.g., a user computer with a graphical user interface or a web browser through which users can interact with implementations of the systems and techniques described herein), or a computing system including any combination of such background components, middleware components or front-end components. Components of the system can be connected to each other through digital data communication in any form or medium (e.g., a communication network). Examples of the communication network include: a local area network (LAN), a wide area network (WAN) and the Internet.

A computing system may include a client and a server. The client and server are generally remote from each other and usually interact through a communication network. A relationship between the client and the server is generated by computer programs running on corresponding computers and having a client-server relationship with each other. The server can be a cloud server, which is also known as a cloud computing server or a cloud host. It is a host product in the cloud computing service system to solve the defects of huge management difficulty and weak business scalability existing in traditional physical host and VPS service ("Virtual Private Server", or "VPS" for short). The server can also be a server of a distributed system, or a server combined with a blockchain.

The technology according to the present application realizes a test for speed reporting delay time of a vehicle perception system, where the speed reporting delay time is used to reflect sensitivity of the vehicle perception system to perceive a speed of an obstacle. Therefore, the technology according to the present application realizes a test for sensitivity of the vehicle perception system to perceive a speed of an obstacle, which is helpful to improve the sensitivity of the vehicle perception system to perceive the speed of the obstacle It should be understood that steps can be reordered, added or deleted using the various forms of processes shown above. For example, the steps described in the present application can be executed in parallel, sequentially or in a different order, so long as the desired result of the technical solution disclosed in the present application can be achieved, which is not limited herein.

The above specific implementations do not constitute a limitation to the protection scope of the present application. It should be understood by those skilled in the art that various modifications, combinations, sub-combinations, and substitutions may be performed according to design requirements and other factors. Any modification, equivalent substitution, improvement and others that are made within the spirit and principle of the present application shall be included in the protection scope of the present application.

What is claimed is:

1. A testing method for a vehicle perception system, comprising:
    acquiring an actual speed and a perceptual speed of a test object, wherein the perceptual speed of the test object is a speed of the test object perceived by the vehicle perception system, a timestamp of the actual speed is a positioning timestamp, a timestamp of the perceptual speed is a point cloud timestamp;
    comparing positioning timestamps corresponding to multiple actual speeds of the test object with point cloud timestamps corresponding to multiple perceptual speeds, and determining the actual speed corresponding to the positioning timestamp with a smallest time difference from the point cloud timestamp as the actual speed corresponding to the point cloud timestamp; and
    determining, according to the actual speed of the test object and the perceptual speed of the test object, speed reporting delay time of the vehicle perception system, wherein the speed reporting delay time is used to reflect sensitivity of the vehicle perception system to perceive a speed of an obstacle;
    wherein the determining, according to the actual speed of the test object and the perceptual speed of the test object at each point cloud timestamp, the speed reporting delay time of the vehicle perception system comprises:
    determining, according to the actual speed of the test object at each point cloud timestamp, a first time when a state of the test object changes from being stationary to moving;
    determining, according to the perceptual speed of the test object at each point cloud timestamp, a second time when the vehicle perception system perceives that the state of the test object changes from being stationary to moving; and
    determining a difference between the first time and the second time as the speed reporting delay time of the vehicle perception system.

2. The testing method for a vehicle perception system according to claim 1, wherein the acquiring the perception speed of the test object comprises:

determining, from obstacles perceived by the vehicle perception system in a test period, a target obstacle that matches the test object; and determining a perceptual speed corresponding to the target obstacle as the perceptual speed of the test object.

3. The testing method for a vehicle perception system according to claim 2, wherein the determining, from the obstacles perceived by the vehicle perception system in the test period, the target obstacle that matches the test object comprises:

acquiring an actual position of the test object, wherein the actual position of the test object is acquired by the motion collection apparatus of the test object, comparing positioning timestamps corresponding to multiple actual positions of the test object with point cloud timestamps corresponding to multiple perceptual speeds, and determining the actual position corresponding to the positioning timestamp with a smallest time difference from the point cloud timestamp as the actual position corresponding to the point cloud timestamp; and determining, according to the actual position of the test object under each point cloud timestamp and perceptual positions of the obstacles perceived by the vehicle perception system in the test period, the target obstacle that matches the test object.

4. The testing method for a vehicle perception system according to claim 1, wherein the acquiring the actual speed of the test object comprises:

acquiring actual speeds of the test object in multiple test periods;

determining whether actual speeds of the test object in the test periods meet a test requirement; and obtaining the actual speeds of the test object in the test periods if the actual speeds of the test object in the test periods meet the test requirement.

5. The testing method for a vehicle perception system according to claim 1, wherein there are multiple test periods, and the determining, according to the actual speed of the test object and the perceptual speed of the test object, the speed reporting delay time of the vehicle perception system comprises:

determining, for each test period, according to the actual speed of the test object and the perceptual speed of the test object, speed reporting delay time of the vehicle perception system in the test period; and determining, according to speed reporting delay time in the multiple test periods, the speed reporting delay time of the vehicle perception system.

6. The testing method for a vehicle perception system according to claim 5, wherein the multiple test periods belong to different test scenarios, and the determining, according to the speed reporting delay time in the multiple test periods, the speed reporting delay time of the vehicle perception system comprises:

determining, for each test scenario, according to the speed reporting delay time in the test period belonging to the test scenario, speed reporting delay time of the vehicle perception system in the test scenario; and determining, according to the speed reporting delay time of the vehicle perception system in each test scenario, the speed reporting delay time of the vehicle perception system.

7. The testing method for a vehicle perception system according to claim 6, wherein the multiple test scenarios belong to different scenario categories, and the determining, according to the speed reporting delay time of the vehicle perception system in each test scenario, the speed reporting delay time of the vehicle perception system comprises:

determining, for each scenario category, according to speed reporting delay time of the vehicle perception system in the test scenario belonging to the scenario category, speed reporting delay time of the vehicle perception system under the scenario category.

8. The testing method for a vehicle perception system according to claim 6, wherein the acquiring the actual speed of the test object and the perceptual speed of the test object comprises:

obtaining, according to a preset corresponding relationship between the test scenario and the test period, from collected data in the multiple test scenarios, actual speeds of the test object and perceptual speeds of the test object in each test period.

9. A testing apparatus for a vehicle perception system, comprising:

at least one processor, and a memory communicatively connected to the at least one processor; wherein the memory stores instructions executable by the at least one processor, and the instructions are executed by the at least one processor, so that the at least one processor is configured to:

acquire an actual speed and a perceptual speed of a test object, wherein the perceptual speed of the test object is a speed of the test object perceived by the vehicle perception system, a timestamp of the actual speed is a positioning timestamp, the timestamp of the perceptual speed is a point cloud timestamp;

compare the positioning timestamps corresponding to multiple actual speeds of the test object with the point cloud timestamp corresponding to multiple perceptual speeds, and determine the actual speed corresponding to the positioning timestamp with a smallest time difference from the point cloud timestamp as the actual speed corresponding to the point cloud timestamp; and determine, according to the actual speed of the test object and the perceptual speed of the test object, speed reporting delay time of the vehicle perception system, wherein the speed reporting delay time is used to reflect sensitivity of the vehicle perception system to perceive a speed of an obstacle;

wherein the at least one processor is further configured to:

determine, according to the actual speed of the test object at each point cloud timestamp, a first time when a state of the test object changes from being stationary to moving;

determine, according to the perceptual speed of the test object at each point cloud timestamp, a second time when the vehicle sensing system perceives that the state of the test object changes from being stationary to moving; and determine a difference between the first time and the second time as the speed reporting delay time of the vehicle perception system.

10. The testing apparatus for a vehicle perception system according to claim 9, wherein the at least one processor is configured to:

determine, from obstacles perceived by the vehicle perception system in a test period, a target obstacle that matches the test object; and determine a perceptual speed corresponding to the target obstacle as the perceptual speed of the test object.

11. The testing apparatus for a vehicle perception system according to claim 10, wherein the at least one processor is configured to:
- acquire an actual position of the test object, compare positioning timestamps corresponding to multiple actual positions of the test object with point cloud timestamps corresponding to multiple perceptual speeds, and determine the actual position corresponding to the positioning timestamp with a smallest time difference from the point cloud timestamp as the actual position corresponding to the point cloud timestamp; and
- determine, according to an actual position of the test object under each point cloud timestamp and perceptual positions of the obstacles perceived by the vehicle perception system in the test period, the target obstacle that matches the test object.

12. The testing apparatus for a vehicle perception system according to claim 9, wherein the at least one processor is configured to:
- acquire actual speeds of the test object in multiple test periods; and
- determine whether the actual speeds of the test object in the test periods meet a test requirement and obtain the actual speeds of the test object in the test periods if the actual speeds of the test object in the test periods meet the test requirement.

13. The testing apparatus for a vehicle perception system according to claim 9, wherein there are multiple test periods, and the at least one processor is configured to:
- determine, for each test period, according to the actual speed of the test object and the perceptual speed of the test object, speed reporting delay time of the vehicle perception system in the test period; and
- determine, according to speed reporting delay time in the multiple test periods, the speed reporting delay time of the vehicle perception system.

14. The testing apparatus for a vehicle perception system according to claim 13, wherein the multiple test periods belong to different test scenarios, and the at least one processor is configured to:
- determine, for each test scenario, according to the speed reporting delay time in the test period belonging to the test scenario, speed reporting delay time of the vehicle perception system in the test scenario; and
- determine, according to the speed reporting delay time of the vehicle perception system in each test scenario, the speed reporting delay time of the vehicle perception system.

15. The testing apparatus for a vehicle perception system according to claim 14, wherein the multiple test scenarios belong to different scenario categories, and the at least one processor is configured to:
- determine, for each scenario category, according to speed reporting delay time of the vehicle perception system in the test scenario belonging to the scenario category, speed reporting delay time of the vehicle perception system under the scenario category.

16. A non-transitory computer-readable storage medium, having computer instructions stored thereon, wherein the computer instructions are used to enable a computer to:
- acquire an actual speed and a perceptual speed of a test object, wherein the perceptual speed of the test object is a speed of the test object perceived by a vehicle perception system, a timestamp of the actual speed is a positioning timestamp, a timestamp of the perceptual speed is a point cloud timestamp;
- compare positioning timestamps corresponding to multiple actual speeds of the test object with point cloud timestamps corresponding to multiple perceptual speeds, and determine the actual speed corresponding to the positioning timestamp with a smallest time difference from the point cloud timestamp as the actual speed corresponding to the point cloud timestamp; and
- determine, according to the actual speed of the test object and the perceptual speed of the test object, speed reporting delay time of the vehicle perception system, wherein the speed reporting delay time is used to reflect sensitivity of the vehicle perception system to perceive a speed of an obstacle;
- wherein the computer instructions are further used to enable the computer to:
- determine, according to the actual speed of the test object at each point cloud timestamp, a first time when a state of the test object changes from being stationary to moving;
- determine, according to the perceptual speed of the test object at each point cloud timestamp, a second time when the vehicle sensing system perceives that the state of the test object changes from being stationary to moving; and
- determine a difference between the first time and the second time as the speed reporting delay time of the vehicle perception system.

* * * * *